(12) United States Patent
Horng et al.

(10) Patent No.: US 6,982,505 B2
(45) Date of Patent: Jan. 3, 2006

(54) PRESTRESSING STRUCTURE FOR ROTATIONALLY BALANCING A MOTOR

(75) Inventors: Alex Horng, Kaohsiung (TW); Yin-Rong Hong, Kaohsiung (TW)

(73) Assignee: Sunonwealth Electric Machine Industry Co., Ltd., Kaohsiung (TW)

(*) Notice: Subject to any disclaimer, the term of this patent is extended or adjusted under 35 U.S.C. 154(b) by 0 days.

(21) Appl. No.: 10/796,021

(22) Filed: Mar. 10, 2004

(65) Prior Publication Data
US 2005/0179327 A1    Aug. 18, 2005

(51) Int. Cl.
H02K 5/24 (2006.01)
H02K 21/00 (2006.01)
H02K 17/00 (2006.01)

(52) U.S. Cl. ................. 310/51; 310/67 R; 310/156.04; 310/156.74

(58) Field of Classification Search ........... 310/156.02, 310/156.04, 156.74–156.77, 51, 67 R
See application file for complete search history.

(56) References Cited

U.S. PATENT DOCUMENTS 5,578,882 A * 11/1996 Dunfield et al. ........... 310/90.5
6,081,057 A *  6/2000 Tanaka et al. ............. 310/90
6,097,120 A    8/2000 Horng
6,400,054 B1 *  6/2002 Horng ......................... 310/91
6,414,411 B1 *  7/2002 Horng et al. ............... 310/194
6,448,675 B1 *  9/2002 Horng et al. ............. 310/67 R
6,483,209 B1   11/2002 Horng et al.
6,700,241 B1 *  3/2004 Horng et al. ............. 310/67 R

FOREIGN PATENT DOCUMENTS

TW   383818   3/2000
TW   422365   2/2001

OTHER PUBLICATIONS

Alex Horng, *Positioning Structures for a Motor Rotor*, Abandoned U.S. Appl. No. 09/366,636.

* cited by examiner

*Primary Examiner*—Tran Nguyen
(74) *Attorney, Agent, or Firm*—Bacon & Thomas, PLLC (57) ABSTRACT

A prestressing structure for rotationally balancing a motor includes a motor stator, a motor rotor, a magnetically conductive member and a balancing magnet. The motor stator has an axial hole and an axial tube extending therethrough. An end of the axial tube provides with the magnetically conductive member. The motor rotor has an inner surface and a shaft seat mounted thereon. A top portion of the shaft seat provides with the balancing magnet which has at least one surface successively attracting at least one surface of the magnetically conductive member for stabilizing rotary movement of the motor.

8 Claims, 6 Drawing Sheets

PRESTRESSING STRUCTURE FOR ROTATIONALLY BALANCING A MOTOR

BACKGROUND OF THE INVENTION

1. Field of the Invention

The present invention relates to a prestressing structure for rotationally balancing a motor. More particularly, the present invention relates to a motor rotor and a motor stator employing a balancing magnet and a magnetically conductive member to generate a prestressing force therebetween so that rotary balance of the motor is maintained.

2. Description of the Related Art

Figure 1:
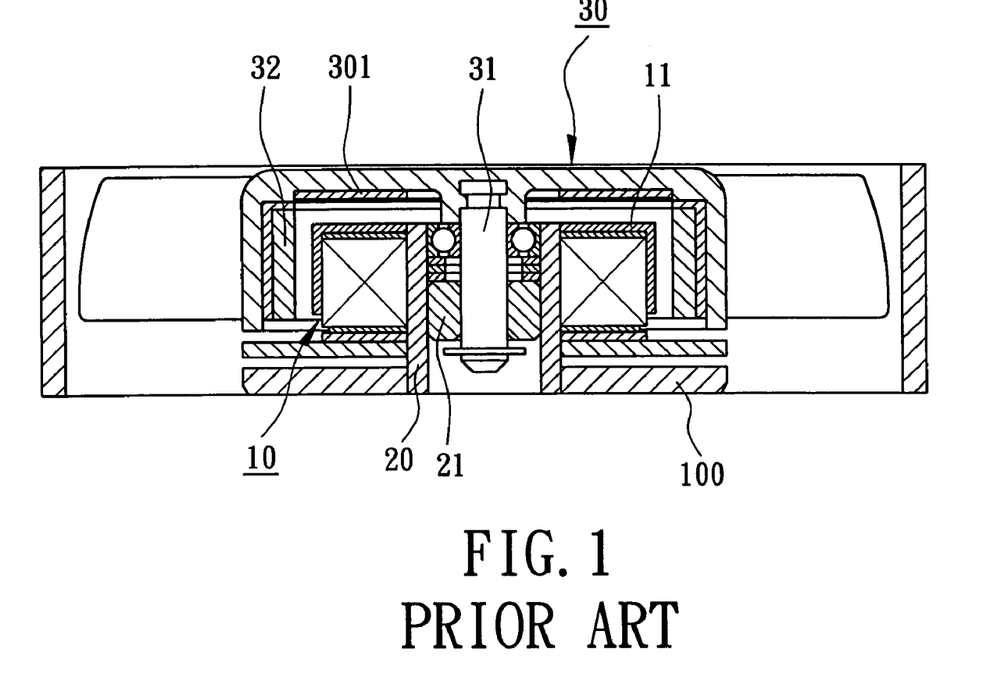
FIG. 1 is a cross-sectional view of a conventional rotational balance structure for a motor in accordance with the prior art.

Referring initially to FIG. 1, Taiwanese Patent Publication No. 383818, entitled "HEAT DISSIPATION FAN STRUCTURE HAVING A MAGNETICALLY POSITIONING DEVICE," discloses a conventional rotational balance structure for a motor. The motor includes a motor stator 10, an axial tube 20, a motor rotor 30 and a magnetically conductive metal plate 301. The motor stator 10 employs the axial tube 20 to mount on a hub base 100, and provides with a plurality of pole plates 11. The axial tube 20 accommodates a bearing member 21 that allows a rotary member. The motor rotor 30 consists of an axial shaft 31 and an annular magnet 32. In assembling, the axial shaft 31 of the motor rotor 30 extends through an elongated hole of the axial tube 30 and the annular magnet 32 of the motor rotor 30 corresponds pole faces of the pole plates 11 of the motor stator 10. The magnetically conductive metal plate 301 is attached to an inner surface of the motor rotor 30 in proper and combined therewith. Meanwhile, the magnetically conductive metal plate 301 has an outer circumference corresponding to top portions of the pole plates 11 of the motor stator 10. When the motor is operated, the pole plates 11 of the motor stator 10 magnetize the magnetically conductive metal plate 301 that may maintains rotary balance of the motor rotor 30. Consequently, it reduces operational vibration the motor and abrasion of the bearing member 21 that may increase the useful life of the motor.

However, there exist several drawbacks as follows:

1. The magnetically conductive metal plate 301 may result in reduction of excitation efficiency of the pole plates 11 due to magnetic loss of the magnetically conductive metal plate 301 with respect to the motor rotor 30.

2. The mass of the magnetically conductive metal plate 301 may also result in a heavy burden of the motor rotor 30 that may result in reduction of motor speed.

3. In starting the motor, the magnetically conductive metal plate 301 fails to provide with an attractive force on the motor stator 20 a short period for balancing rotary movement of the motor rotor 30. Consequently, it may result in abrasion of the bearing member 21 in long-term use.

Other Examples of such a rotational balance structure for a motor are illustrated by U.S. Pat. No. 6,097,120 to Homg, entitled "BRUSHLESS DC MOTOR ASSEMBLY," Taiwanese Patent Publication No. 422365, entitled "HEAT DISSIPATION FAN STRUCTURE HAVING A MAGNETICALLY POSITIONING DEVICE," and U.S. patent application Ser. No. 09/366,636, entitled "POSITIONING STRUCTURES FOR A MOTOR ROTOR." In these patents, a magnetically conductive metal plate is mounted on a bottom portion of a motor stator and corresponding to an annular magnet of a motor rotor. An attractive force between the magnetically conductive metal plate and the annular magnet maintains rotational balance of the motor when operated. However, the magnetically conductive metal plate may result in reduction of excitation efficiency of pole plates of the motor stator which is in connection with the magnetically conductive metal plate. Moreover, the magnetically conductive metal plate may result in a short circuit of a printed circuit board which is in connection with the magnetically conductive metal plate.

Another conventional rotational balance structure for a motor, U.S. Pat. No. 6,483,209 to Homg et al., entitled "BALANCE RINGS FOR MOTORS," it discloses a magnetically conductive metal plate mounted on a bottom portion of a motor stator. The magnetically conductive metal plate includes at least one upright wall corresponding to an annular magnet of a motor rotor. An attractive force between the upright wall of the magnetically conductive metal plate and the annular magnet maintains rotational balance of the motor when operated. However, the upright wall of the magnetically conductive metal plate may occupy a partial space for distributing blades of the motor rotor when the upright wall of the magnetically conductive metal plate is corresponding to an outer end circumference of the annular magnet. Alternatively, the upright wall of the magnetically conductive metal plate may result in reduction of excitation efficiency of pole plates of the motor stator when the upright wall of the magnetically conductive metal plate is corresponding to an inner circumference of the annular magnet. Consequently, the upright wall of the magnetically conductive metal plate may increase a total radius of the motor that may increase its dimensions of the motor.

Another conventional rotational balance structure for a motor, U.S. patent application Ser. No. 10/304,761, entitled "POSITIONING DEVICE FOR PRESTRESSING MAGNET OF SPINDLE MOTOR," it discloses positioning means for mounting a prestressing magnet on a pole plate of motor stator in proper. The prestressing magnet attracts a metal casing of a motor rotor that balances rotary movement of the motor. However, the prestressing magnet is disposed proximate the pole plate of motor stator that may result in reduction of excitation efficiency of pole plate of the motor stator.

Another conventional rotational balance structure for a motor, U.S. Pat. No. 6,448,675 to Homg et al., entitled "ROTATIONALLY BALACING STRUCTURE FOR AN AC MOTOR," it discloses an inner rotor type ac motor. The motor includes a balance plate and a permanent magnet ring each of which selectively mounted to distal ends of an outer stator and an inner rotor. An attractive force between the balance plate and the permanent magnet ring maintains rotational balance of the motor when operated. However, the prestressing magnet is disposed proximate the pole plate of motor stator that may result in reduction of excitation efficiency of pole plate of the motor stator.

The present invention intends to provide a motor rotor and a motor stator employing a balancing magnet and a magnetically conductive member to generate a prestressing force therebetween. The balancing magnet and the magnetically conductive member provide with an appropriate prestrssing force for balancing rotary movement and minimize a gap formed therebetween for prevent dust from entering therethrough. The positions of the balancing magnet and the magnetically conductive member are separated from pole plates of the motor stator to avoid magnetic loss in such a way to mitigate and overcome the above problem.

SUMMARY OF THE INVENTION

The primary objective of this invention is to provide a prestressing structure for rotationally balancing a motor, which includes a motor rotor and a motor stator employing a balancing magnet and a magnetically conductive member to generate a prestressing force therebetween so that rotary balance of the motor is maintained.

The secondary objective of this invention is to provide the prestressing structure for rotationally balancing the motor, which includes a shaft seat of a motor rotor mounting a balancing magnet and a motor stator mounting a magnetically conductive member to minimize a gap therebetween so that foreign dust is obstructed.

The prestressing structure for rotationally balancing the motor in accordance with the present invention includes a motor stator, a motor rotor, a magnetically conductive member and a balancing magnet. The motor stator has an axial hole and an axial tube extending therethrough. An end of the axial tube provides with the magnetically conductive member. The motor rotor has an inner surface and a shaft seat mounted thereon. A top portion of the shaft seat provides with the balancing magnet which has at least one surface successively attracting at least one surface of the magnetically conductive member for stabilizing rotary movement of the motor.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings wherein.

DETAILED DESCRIPTION OF THE INVENTION

Referring to FIGS. 2 through 9, reference numerals of the first through sixth embodiments of the present invention have applied the identical numerals of the conventional motor members, as shown in FIG. 1. The construction of motor members in accordance with embodiments of the present invention have similar configuration and same function as that of the conventional motor members and detailed descriptions may be omitted.

Figure 2:
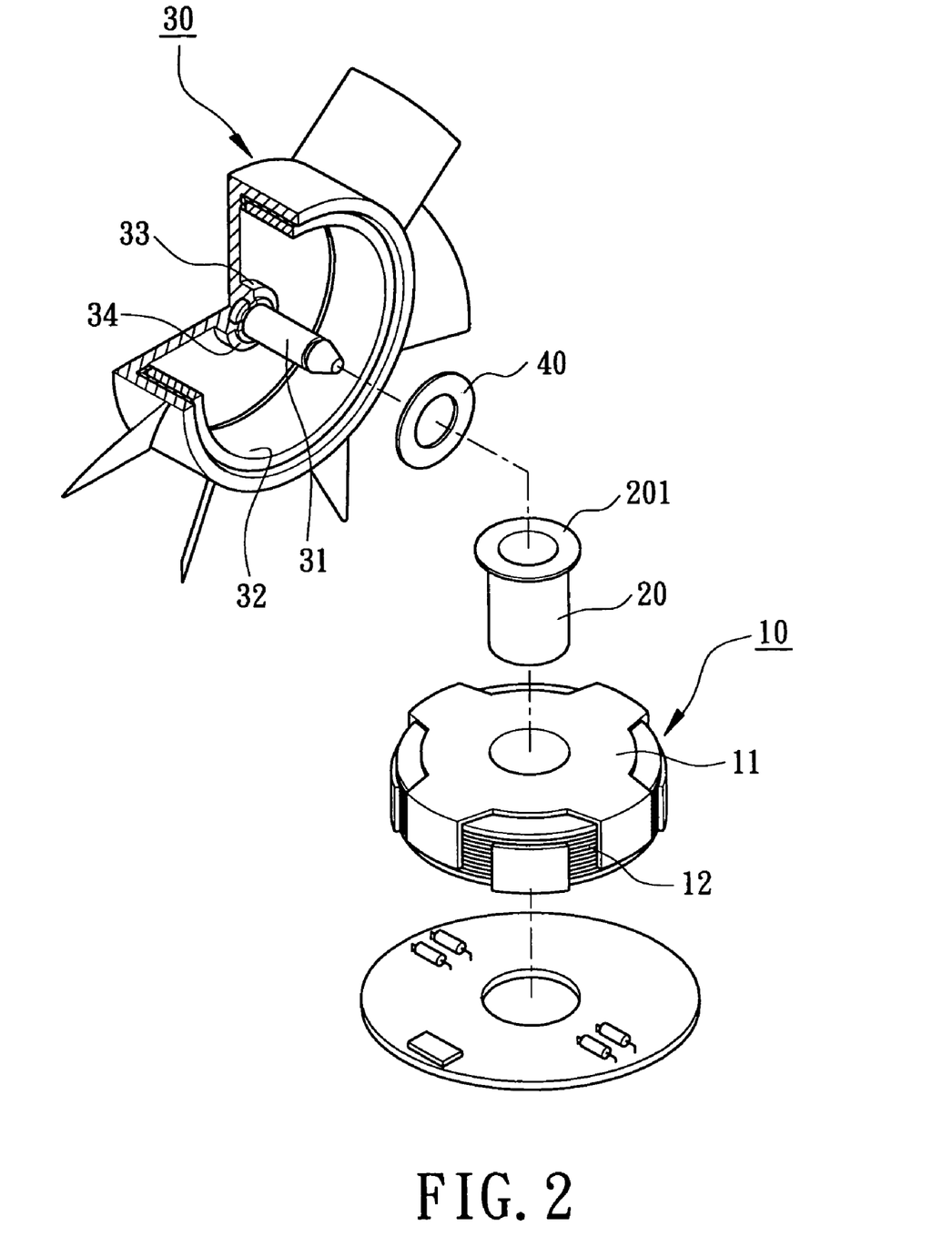
FIG. 2 is an exploded perspective view of a prestressing structure for rotationally balancing a motor in accordance with a first embodiment of the present invention.
Figure 3:
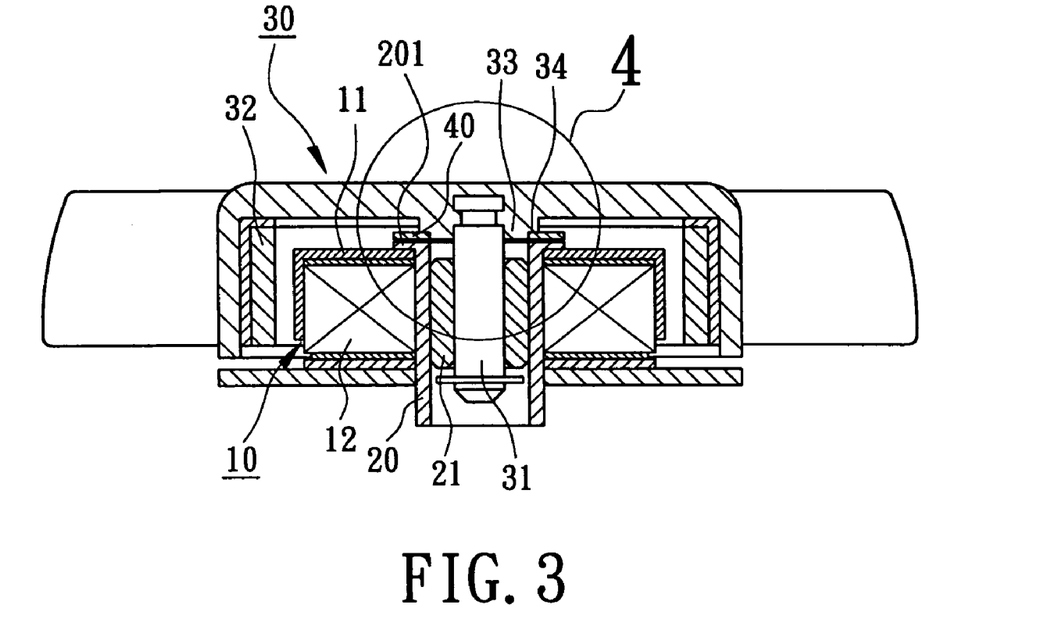
FIG. 3 is a cross-sectional view of the prestressing structure for rotationally balancing the motor in accordance with the first embodiment of the present invention.
Figure 4:
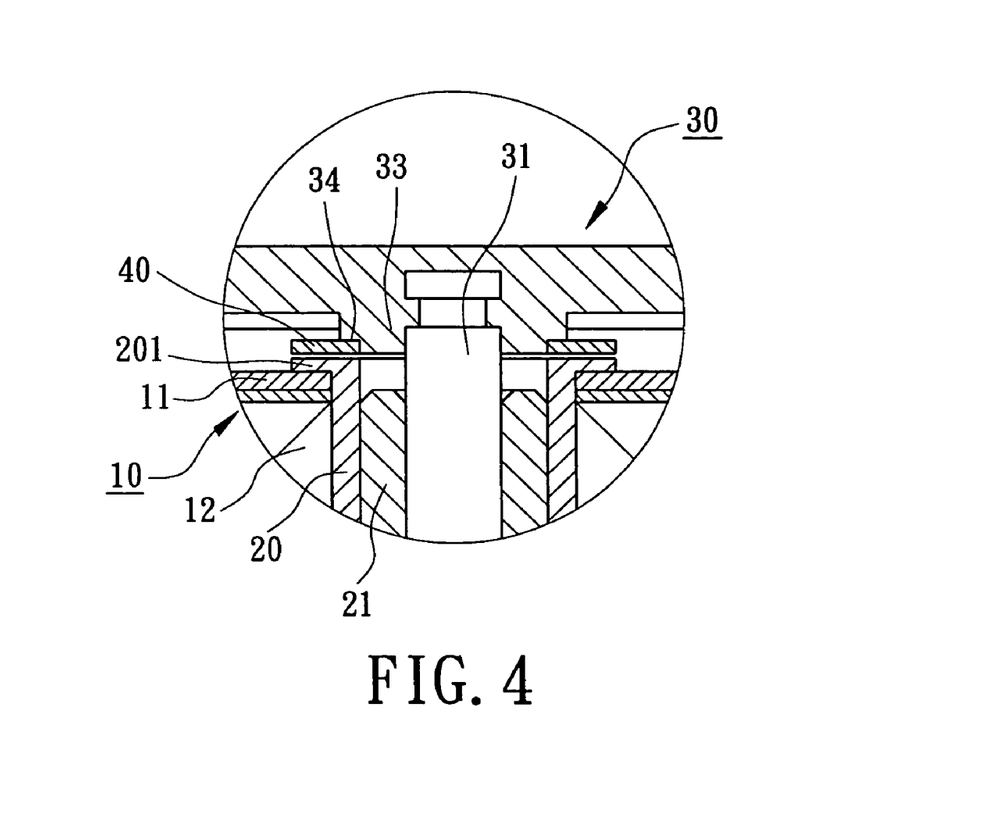
FIG. 4 is an enlarged view, in FIG. 3, of the prestressing structure for rotationally balancing the motor in accordance with the first embodiment of the present invention.

Referring to FIGS. 2 through 4, a prestressing structure for rotationally balancing a motor in accordance with a first embodiment of the present invention includes a motor stator 10, a magnetically conductive member 201, a motor rotor 30 and a balancing magnet 40.

Referring again to FIGS. 2 through 4, construction of the motor stator 10 shall be described in detail. The motor stator 10 consists of at least one pole plate 11 and at least one coil 12. The pole plate 11 of the motor stator 10 may be alternatively magnetized when a current and a counter current pass through the coil 12 in turn. The motor stator 10 further has an axial hole (not labeled) and an axial tube 20 extending therethrough.

Referring again to FIGS. 2 through 4, construction of the axial tube 20 shall be described in detail. The motor stator 10 employs the axial tube 20 for connecting to a motor member, a casing for example. Preferably, the axial tube 20 is made of magnetically conductive material and integrally formed a radial flange at its top end to constitute the magnetically conductive member 201. The radial flange of the axial tube 20 is used to mount the motor stator 10.

Referring again to FIGS. 2 through 4, construction of the motor rotor 30 shall be described in detail. The motor rotor 30 consists of a rotary shaft 31, an annular magnet 32 and a shaft seat 33. The shaft seat 33 is a bulge member longitudinally raised on an inner surface of the motor rotor 30 at its center portion. Moreover, the shaft seat 33 forms a stepped portion 34 adapted to engage or adhere with the balancing magnet 40. The rotary shaft 31 longitudinally projects downwardly from the shaft seat 33 and extends through a bearing member (sleeve bearing or ball bearing) 21 contained in the axial tube 20 after assembling. The annular magnet 32 surrounds pole faces (not labeled) of the pole plate 11 of the motor stator 10 so that the alternatively magnetized pole plate 11 is able to drive the motor rotor 30 for rotation.

Referring again to FIGS. 3 and 4, assembling operation of the motor with the balancing magnet 40 shall be described in detail. The balancing magnet 40 is fixed on the stepped portion 34 of the shaft seat 33 of the motor rotor 30 in proper. Correspondingly, the magnetically conductive member 201 is provided on the top end of the axial tube 20 that faces the balancing magnet 40. Whenever the motor is operated, stopped or restarted, the balancing magnet 40 has at least one lower surface successively attracting an upper surface of the magnetically conductive member 201 that balances and thus stabilizes rotary movement of the motor properly. Preferably, dimensions of the balancing magnet 40 can be selectively adjusted and sized that avoids an additional burden of the balancing magnet 40 on the motor rotor 30. Consequently, the rotational efficiency of the motor rotor 30 is unaffected. Moreover, the balancing magnet 40 is a permanent magnet that can successively attract the magnetically conductive member 201 when the motor rotor 30 is in a stopped state. Consequently, an initially rotational movement of the motor rotor 30 can avoid a short period of unbalance during restarting operation. Furthermore, a gap extending between the balancing magnet 40 and the magnetically conductive member 201 can be adjusted its distance obviously smaller than that extending between an inner surface of the motor rotor 30 and a top surface of the motor stator 10. Consequently, the structural combination of the balancing magnet 40 with the magnetically conductive member 201 can prevent dust or foreign objects entering into the axial tube 20 and thus precipitating on the bearing member 21 that can avoid generating greasy dirt and having being jammed the motor.

Figure 5:
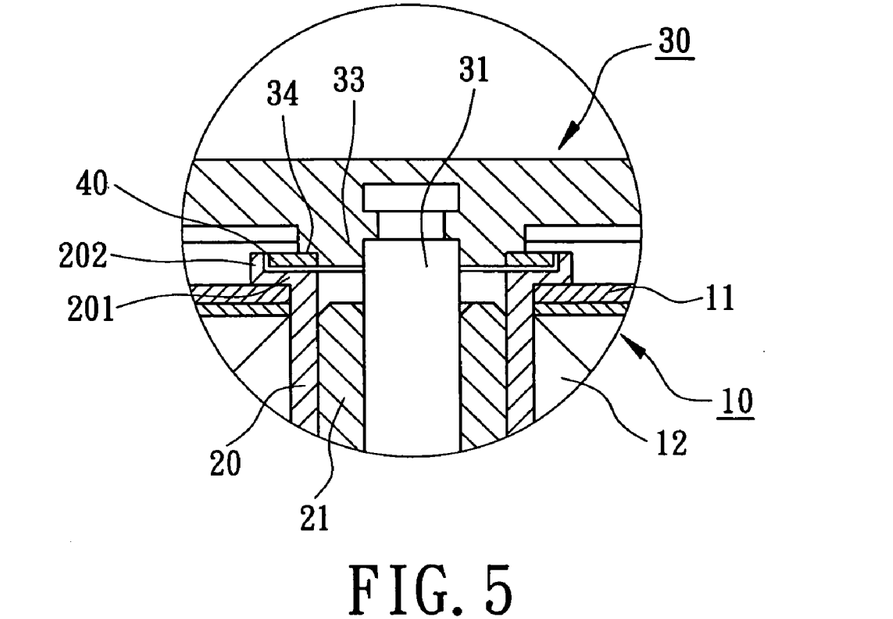
FIG. 5 is an enlarged view, similar to that shown in FIG. 4, of a prestressing structure for rotationally balancing a motor in accordance with a second embodiment of the present invention.

Turning now to FIG. 5, as is known in the first embodiment, a prestressing structure for rotationally balancing a motor in accordance with a second embodiment of the present invention includes a motor stator 10, a magnetically conductive member 201, a motor rotor 30 and a balancing magnet 40. In comparison with the first embodiment, the magnetically conductive member 201 of the second embodiment has an annular wall 202 axially extending from a radial flange. In assembling, the lower surface of the balancing magnet 40 is corresponding to the upper surface of the magnetically conductive member 201 and the outer circumference of the balancing magnet 40 to the inner circumference of the annular wall 202 of the magnetically conductive member 201. Namely, the balancing magnet 40 is contained in the magnetically conductive member 201. The total attracting area of the balancing magnet 40 to the magnetically conductive member 201 is increased that stabilizes rotary movement of the motor. In addition, the annular wall 202 of the magnetically conductive member 201 can enhance dustproof effect for the axial tube 20 and the bearing member 21.

Figure 6:
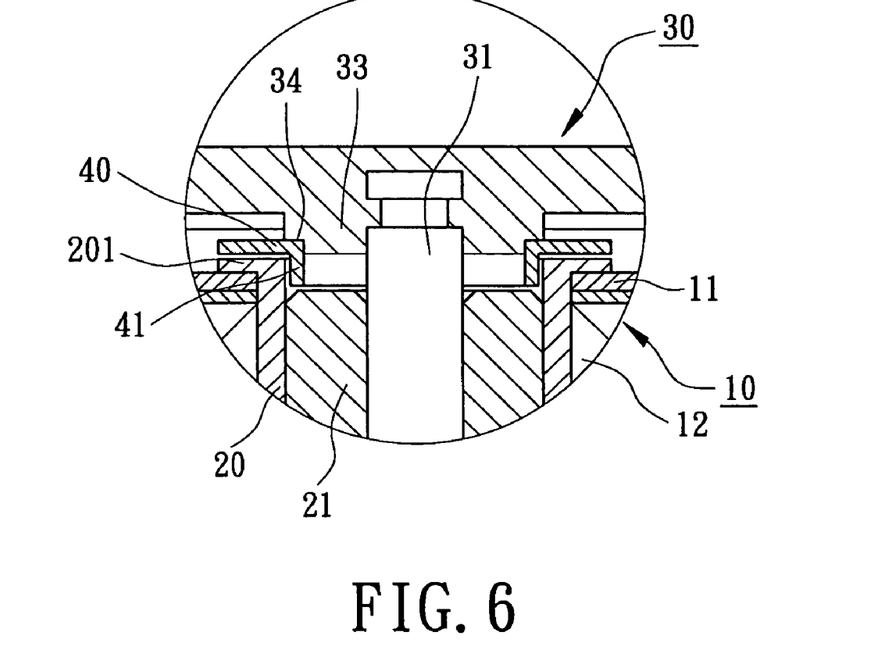
FIG. 6 is an enlarged view, similar to that shown in FIG. 4, of a prestressing structure for rotationally balancing a motor in accordance with a third embodiment of the present invention.

Turning now to FIG. 6, as is known in the first embodiment, a prestressing structure for rotationally balancing a motor in accordance with a third embodiment of the present invention includes a motor stator 10, a magnetically conductive member 201, a motor rotor 30 and a balancing magnet 40. In comparison with the first embodiment, the balancing magnet 40 of the third embodiment has an inner annular wall 41 axially extending from its axial hole. In assembling, the lower surface of the balancing magnet 40 is corresponding to the upper surface of the magnetically conductive member 201 and the outer circumference of the inner annular wall 41 of the balancing magnet 40 to the inner circumference of the axial tube 20. The total attracting area of the balancing magnet 40 to the magnetically conductive member 201 and the axial tube 20 is increased that stabilizes rotary movement of the motor. In addition, the inner annular wall 41 of the balancing magnet 40 can enhance dustproof effect for the axial tube 20 and the bearing member 21.

Figure 7:
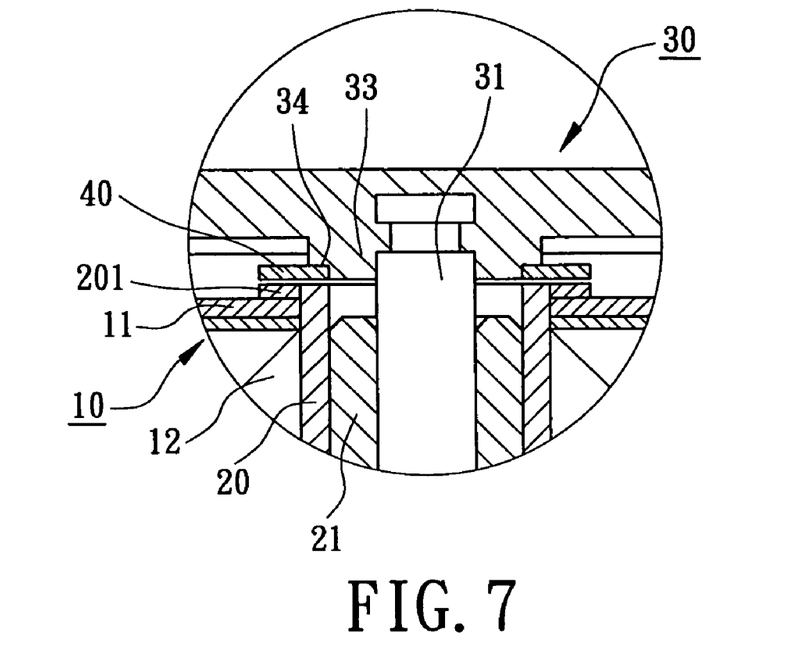
FIG. 7 is an enlarged view, similar to that shown in FIG. 4, of a prestressing structure for rotationally balancing a motor in accordance with a fourth embodiment of the present invention.

Turning now to FIG. 7, as is known in the first embodiment, a prestressing structure for rotationally balancing a motor in accordance with a fourth embodiment of the present invention includes a motor stator 10, a magnetically conductive member 201, a motor rotor 30 and a balancing magnet 40. In comparison with the first embodiment, the magnetically conductive member 201 of the fourth embodiment is a single bush made of magnetically conductive material and sleeved on the top end of the axial tube 20 for mounting the motor stator 10. In assembling, the lower surface of the balancing magnet 40 is corresponding to the upper surface of the magnetically conductive member 201 and the top end of the axial tube 20. The balancing magnet 40 correspondingly attracts the magnetically conductive member 201 and the top end of the axial tube 20 that stabilizes rotary movement of the motor. In addition, a minimized gap extending between the balancing magnet 40 and the magnetically conductive member 21 can enhance dustproof effect for the axial tube 20 and the bearing member 21.

Figure 8:
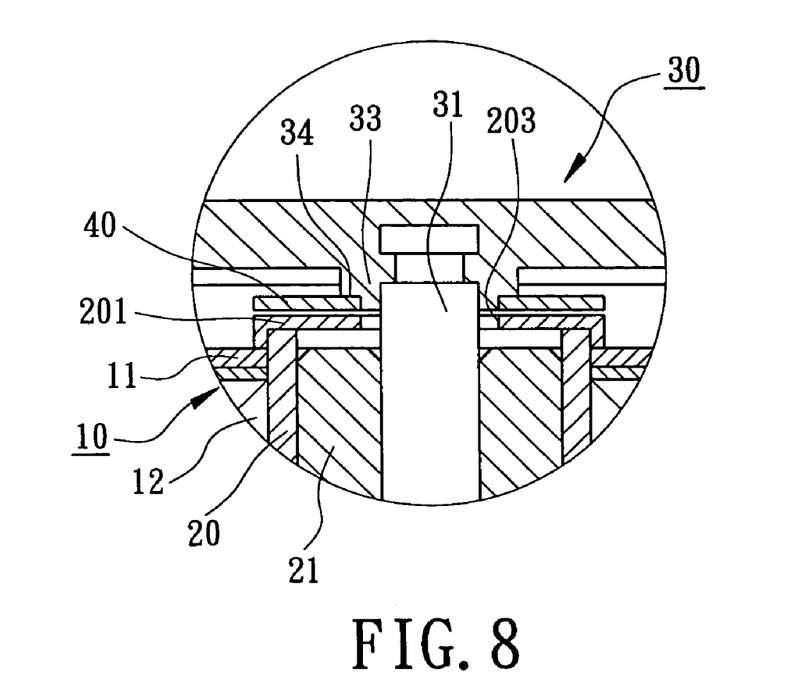
FIG. 8 is an enlarged view, similar to that shown in FIG. 4, of a prestressing structure for rotationally balancing a motor in accordance with a fifth embodiment of the present invention.

Turning now to FIG. 8, as is known in the first embodiment, a prestressing structure for rotationally balancing a motor in accordance with a fifth embodiment of the present invention includes a motor stator 10, a magnetically conductive member 201, a motor rotor 30 and a balancing magnet 40. In comparison with the first embodiment, the magnetically conductive member 201 of the fifth embodiment is a cap made of magnetically conductive material and sleeved on the top end of the axial tube 20 for mounting the motor stator 10. The magnetically conductive member 201 further includes an axial hole 203 through which to pass the rotary shaft 31. In assembling, the lower surface of the balancing magnet 40 is corresponding to the upper surface of the magnetically conductive member 201. The balancing magnet 40 correspondingly attracts the magnetically conductive member 201 that stabilizes rotary movement of the motor. In addition, a minimized gap extending between the balancing magnet 40 and the magnetically conductive member 21 can enhance dustproof effect for the axial tube 20 and the bearing member 21.

Figure 9:
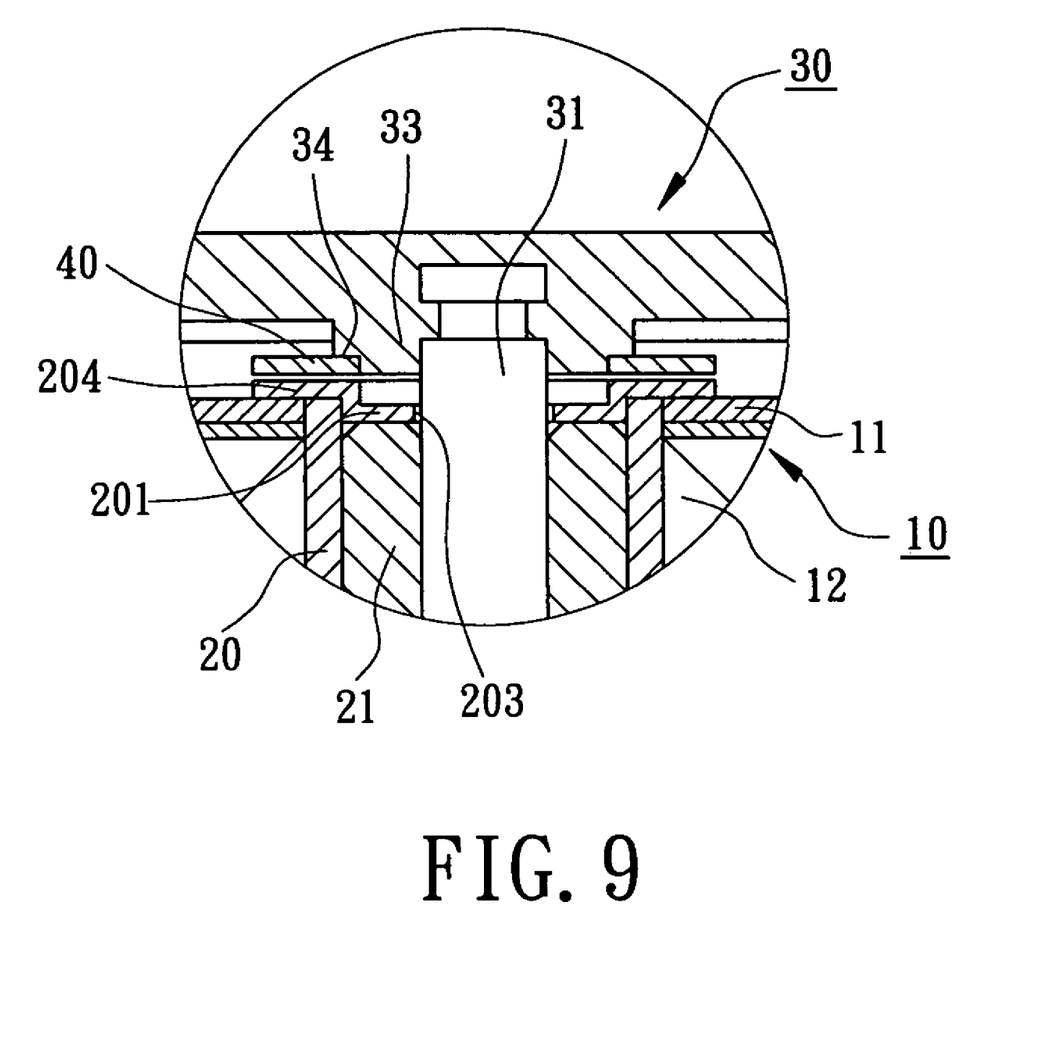
FIG. 9 is an enlarged view, similar to that shown in FIG. 4, of a prestressing structure for rotationally balancing a motor in accordance with a sixth embodiment of the present invention.

Turning now to FIG. 9, as is known in the first embodiment, a prestressing structure for rotationally balancing a motor in accordance with a sixth embodiment of the present invention includes a motor stator 10, a magnetically conductive member 201, a motor rotor 30 and a balancing magnet 40. In comparison with the first embodiment, the magnetically conductive member 201 of the fifth embodiment is a lid made of magnetically conductive material and attached to an end of the bearing member 21. The magnetically conductive member 201 further includes an axial hole 203 and a top bent flange 204. The axial hole 203 allows passage of the rotary shaft 31 and the top bent flange 204 engages with the motor stator 10. In assembling, the lower surface of the balancing magnet 40 is corresponding to the upper surface of the top bent flange 204 of the magnetically conductive member 201. The balancing magnet 40 correspondingly attracts the magnetically conductive member 201 that stabilizes rotary movement of the motor. In addition, a minimized gap extending between the balancing magnet 40 and the magnetically conductive member 21 can enhance dustproof effect for the axial tube 20 and the bearing member 21.

Referring back to FIG. 1, the conventional rotational balance structure may result in reduction of excitation efficiency of the pole plates 11 due to magnetic loss of the magnetically conductive metal plate with respect to the motor rotor 30. Referring back to FIG. 2, however, the prestressing structure in accordance with the present invention consists of the magnetically conductive member 21 mounted on the motor stator 10 and the balancing magnet 40 mounted on the shaft seat 33 of the motor rotor 30. The attractive force of the balancing magnet 40 to the magnetically conductive member 21 stabilizes the rotary movement of the motor and enhances dustproof effect for the axial tube 20 and the bearing member 21.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A prestressing structure for rotationally balancing a motor, comprising:
   a motor stator having an axial tube at its center portion, the axial tube including a top end;
   a magnetically conductive member formed at the top end of the axial tube and including at least one upper surface;

a motor rotor including a shaft seat and a rotary shaft mounted thereto at its center portion, the rotary shaft extending through the axial tube when assembled; and a balancing magnet mounted to the shaft seat of the motor rotor and including at least one lower surface attracting the upper surface of the magnetically conductive member such that a gap formed between said upper surface of the magnetically conductive member and said lower surface of the balancing magnet is minimized to prevent dust from entering an interior of the axial tube when the motor is turning;

wherein said gap is approximately closed by magnetic attraction of said upper surface of said magnetically conductive member towards said lower surface of said balancing magnet when the motor is stopped.

2. The prestressing structure for rotationally balancing the motor as defined in claim 1, wherein the axial tube is integrally formed a radial flange at the top end to constitute the magnetically conductive member so that the lower surface of the balancing magnet attracts an upper surface of the radial flange.

3. The prestressing structure for rotationally balancing the motor as defined in claim 2, wherein the radial flange of the magnetically conductive member includes an annular wall axially extending therefrom so that an outer circumference of the balancing magnet correspondingly attracts an inner circumference of the annular wall.

4. The prestressing structure for rotationally balancing the motor as defined in claim 2, wherein the balancing magnet includes an axial hole and an inner annular wall axially extending therefrom so that an outer circumference of the inner annular wall of the balancing magnet correspondingly attracts an inner circumference of the axial tube.

5. The prestressing structure for rotationally balancing the motor as defined in claim 1, wherein the magnetically conductive member consists of a single bush sleeved on the top end of the axial tube so that the lower surface of the balancing magnet attracts an upper surface of the single bush.

6. The prestressing structure for rotationally balancing the motor as defined in claim 1, wherein the magnetically conductive member consists of a cap sleeved on the top end of the axial tube so that the lower surface of the balancing magnet attracts an upper surface of the cap.

7. The prestressing structure for rotationally balancing the motor as defined in claim 1, wherein the magnetically conductive member consists of a lid sleeved on the top end of the axial tube and attached to an end of a bearing member, the lid further includes a bent top flange extending beyond the axial tube so that the lower surface of the balancing magnet attracts an upper surface of the lid.

8. The prestressing structure for rotationally balancing the motor as defined in claim 1, wherein the shaft seat includes a stepped portion on which to mount the balancing magnet.

* * * * *